United States Patent [19]

Valliant et al.

[11] 4,106,686
[45] Aug. 15, 1978

[54] TAPE TRANSPORT

[75] Inventors: William W. Valliant, La Canada; Manfred G. Michelson, Van Nuys, both of Calif.

[73] Assignee: Data Electronics, Inc., Pasadena, Calif.

[21] Appl. No.: 798,643

[22] Filed: May 19, 1977

Related U.S. Application Data

[63] Continuation of Ser. No. 631,230, Nov. 12, 1975, abandoned.

[51] Int. Cl.² .................................................. B65H 17/18
[52] U.S. Cl. ................................. 226/188; 165/128; 226/187; 226/194
[58] Field of Search ............... 226/188, 187, 186, 180, 226/194, 191, 190, 181, 179; 165/80, 128; 310/52, 91; 318/DIG. 1

[56] References Cited

U.S. PATENT DOCUMENTS

| | | | |
|---|---|---|---|
| 2,632,641 | 3/1953 | Rice | 226/188 |
| 2,965,819 | 12/1960 | Rosenbaum | 165/DIG. 3 |
| 3,022,454 | 2/1962 | Millis | 318/DIG. 1 |
| 3,090,574 | 5/1963 | Doncaster et al. | 226/188 X |
| 3,125,645 | 3/1964 | Cech | 226/188 X |
| 3,383,529 | 5/1968 | Baumann et al. | 310/52 |
| 3,486,675 | 12/1969 | Krechman | 226/181 X |
| 3,698,615 | 10/1972 | Lace | 226/194 |

Primary Examiner—Bruce H. Stoner, Jr.
Attorney, Agent, or Firm—Christie, Parker & Hale

[57] ABSTRACT

A tape transport includes a fixed support for receiving a tape cartridge having a tape drive roller engaged with a bi-directional capstan. The capstan, together with a reversible capstan drive motor and a heat sink surrounding the motor, comprise an integral unit which is mounted to the cartridge support through biasing springs which enable the unit to pivot about its center of gravity relative to the support. The capstan, through its c.g. mount, applies a constant force to the tape drive roller indpendently of external forces acting on the tape drive unit. The electrical drive circuit for the capstan motor includes power transistors which are an integral part of the heat sink for maximizing use of the heat sink as a means for dissipating heat generated by operation of the capstan drive motor and power transistors.

26 Claims, 12 Drawing Figures

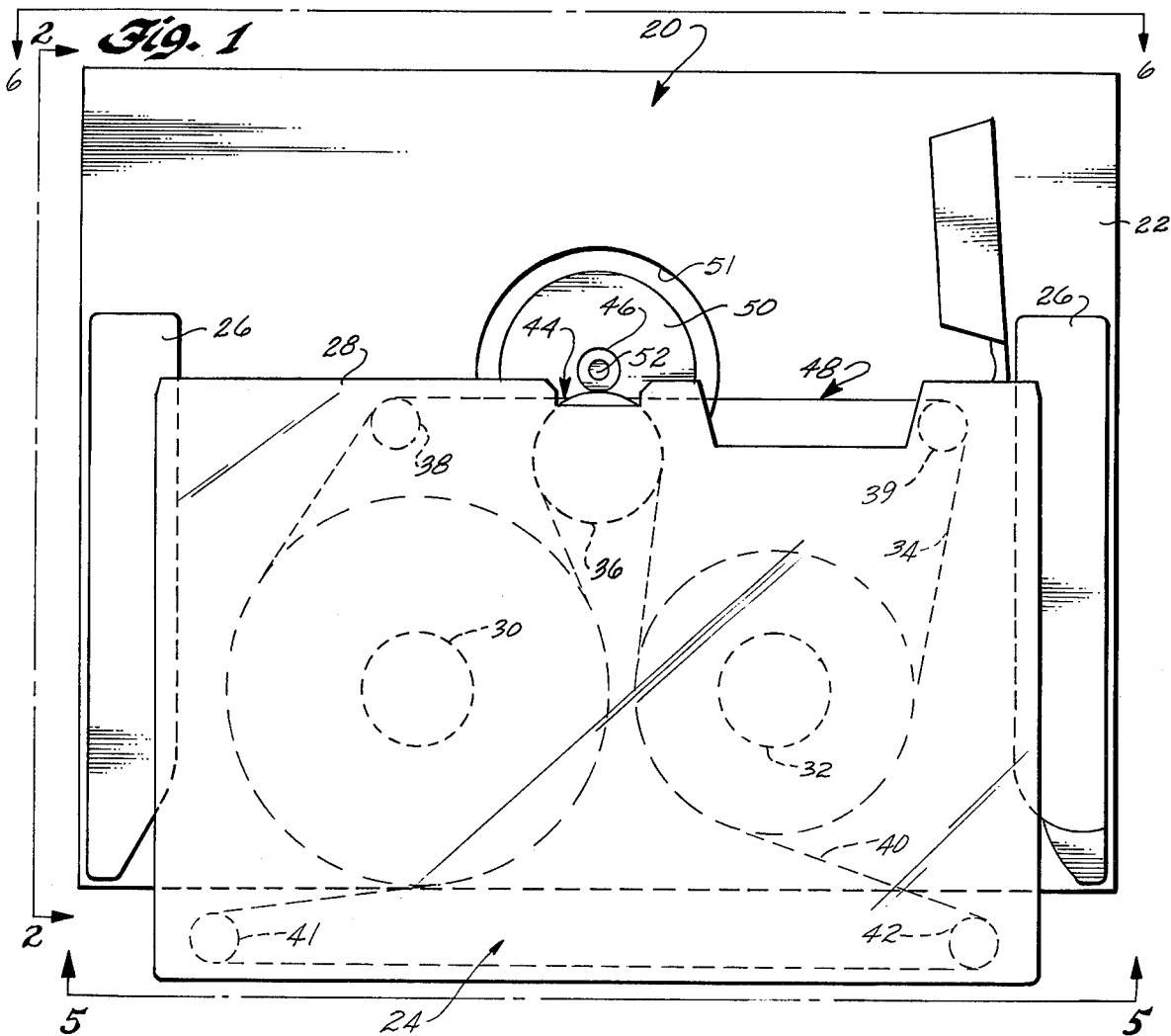

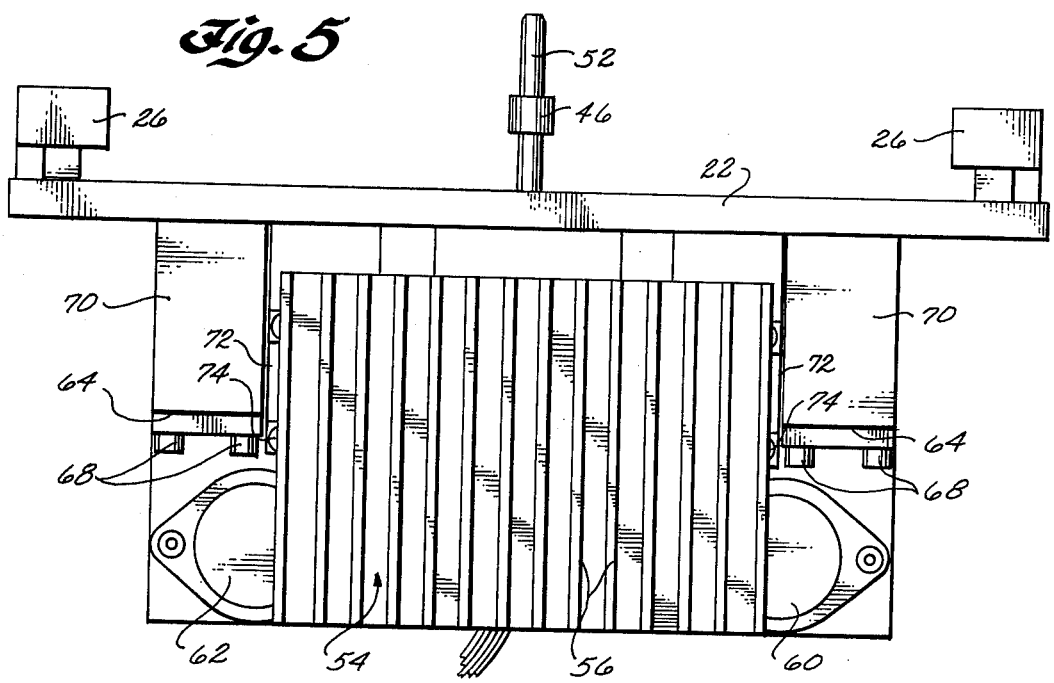
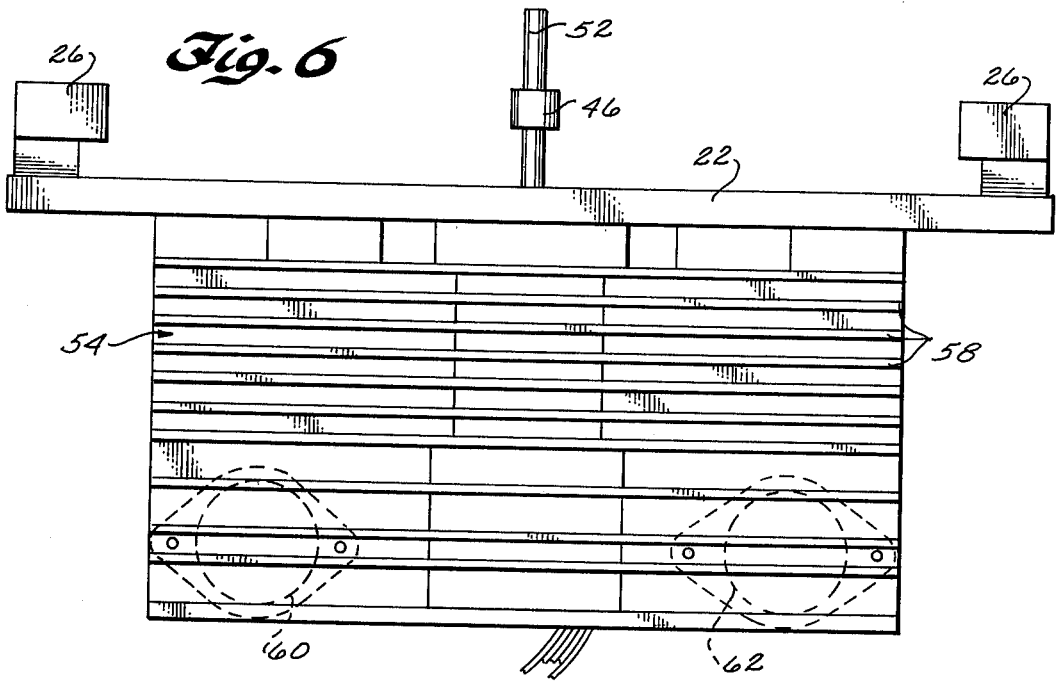

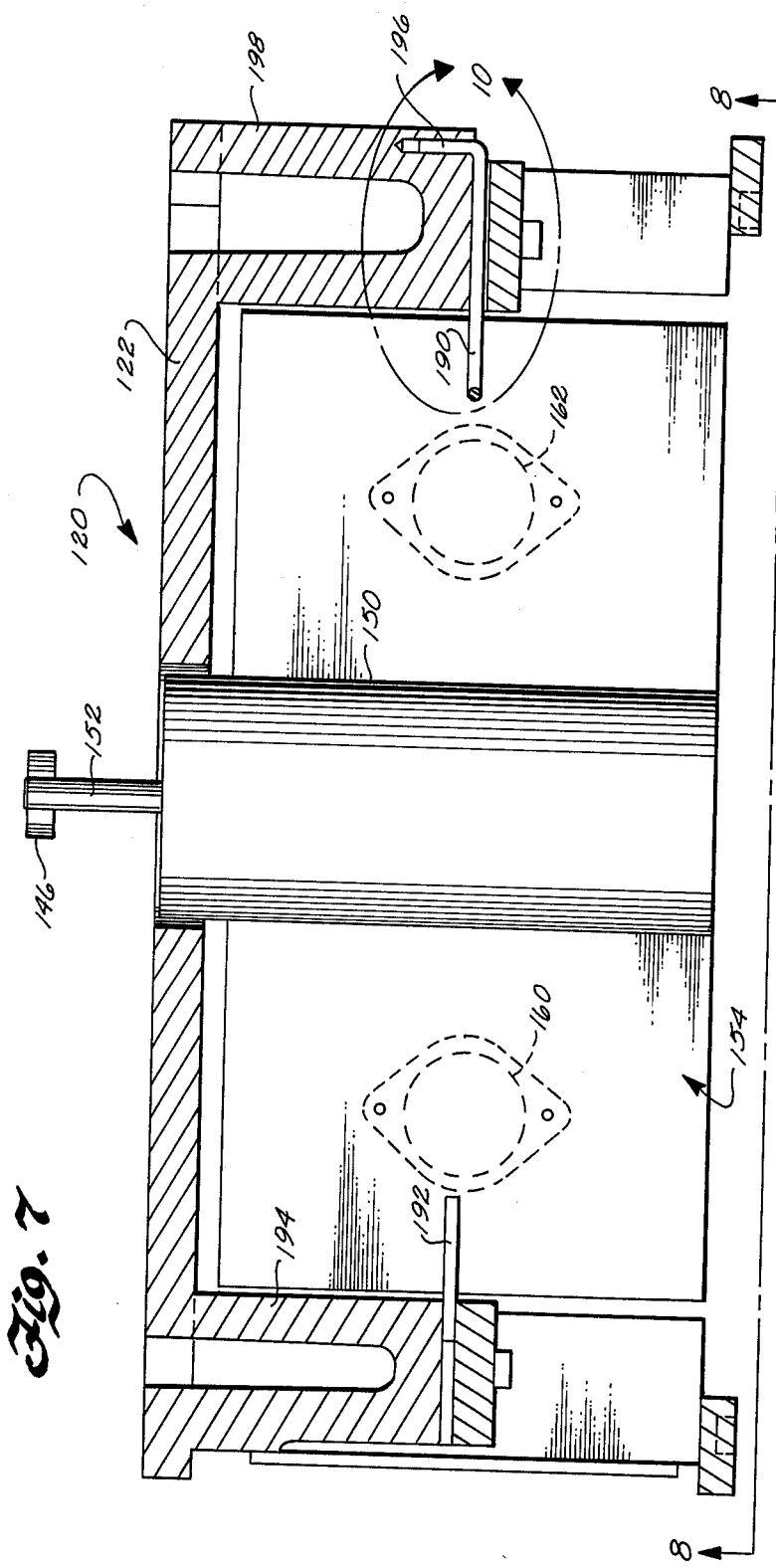

TAPE TRANSPORT

This is a continuation, of application Ser. No. 631,230, filed Nov. 12, 1975, now abandoned.

BACKGROUND

This invention relates to tape transports, and more particularly to an improved tape transport of the type which controls movement of a high speed digital magnetic recording tape used in data recording systems for example.

Tape transports for driving high speed digital magnetic recording tapes may momentarily lose their recording accuracy when subjected to external forces such as high g shock loads. Typical environments where tapes used for data collection are subjected to high g forces include aboard ships in heavy weather or battle situations, or on airplanes during sudden maneuvers.

Magnetic recording tapes also are often placed in extended environments, such as for collecting meterological data over an extended period of time. Tape transports placed in extended environments can be affected not only by shock loads, but also by extreme variations in temperatures.

SUMMARY

This invention provides a tape transport for preventing loss of recording ability when subjected to relatively high shock loads. The invention also is designed to maximize heat dissipation for the tape drive assembly when placed in extended environments subject to temperature extremes.

Briefly, the tape transport comprises a tape drive assembly which includes a capstan for driving a tape, and a motor for driving the capstan. A tape support holds a tape supply means for engagement with the capstan. The tape drive assembly is mounted for pivotal movement relative to the tape support by spring-biasing means extending between the tape support and the tape drive assembly. The tape drive assembly pivots about an axis through its center of gravity to provide spring-biased engagement of the capstan with the tape supply means. This allows the capstan to apply a substantially constant force to the tape supply means independently of external forces acting on the tape support and the tape drive assembly when the tape support is fixed and the tape drive assembly is unconfined other than by its attachment to the tape support.

In the preferred form of the invention, the spring-biasing means comprises longitudinally spaced apart springs on opposite sides of the capstan axis of rotation. Any shock loads acting on the fixed tape support and the tape drive assembly, which would have a tendency to displace the capstan from the tape supply means, are opposed by the spring-biasing means which balances the shock loads due to the mounting of the tape drive assembly about the center of gravity. This allows the capstan to continuously apply a uniform force to the tape supply means independently of the shock load.

Preferably, the biasing springs are arranged so that a constant force will be applied by the capstan independently of whether the tape unit is fixed in a horizontal or vertical orientation.

In another form of the invention, the tape drive assembly includes a heat sink structure which is directly attached around the exterior of the capstan drive motor. Preferably, the heat sink structure includes bi-directional heat transfer fins for dissipating heat energy developed by the motor whether the tape unit is fixed in a horizontal or a vertical orientation.

Drive motor circuit elements having power dissipation characteristics generally inverse to that of the motor are attached directly to the heat sink. This tends to maximize the effectiveness of the heat sink in dissipating heat generated during operation of the motor and the circuit elements.

These and other aspects of the invention will be more fully understood by referring to the following detailed description and the accompanying drawings.

DRAWINGS

FIG. 1 is a plan view showing one embodiment of the tape transport of this invention;

FIG. 2 is a side elevation view taken on line 2—2 of FIG. 1;

FIG. 5 is a front elevation view taken on line 5—5 of FIG. 1;

FIG. 6 is a front elevation view taken on line 6—6 of FIG. 1;

FIG. 7 is a cross-sectional elevation view showing an alternate embodiment of the tape transport of this invention;

FIG. 10 is an enlarged elevation view showing the torsion spring within the circle 10 of FIG. 7;

FIG. 11 is an end elevation view taken on line 11—11 of FIG. 10; and

DESCRIPTION

Figure 3:
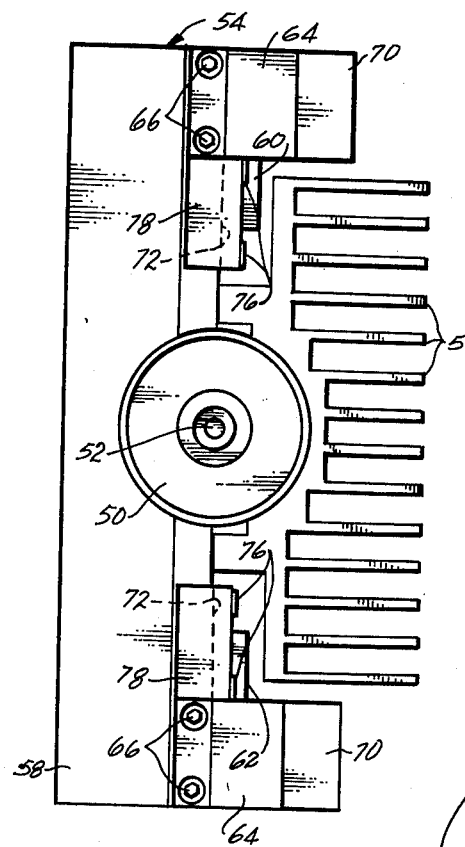
FIG. 3 is a top plan view taken on line 3—3 of FIG. 2.

Referring to FIGS. 1 through 6, a tape transport 20 includes a cartridge support deck 22 for receiving a tape supply means such as a tape cartridge 24. The drawings show the tape cartridge mounted in a horizontal plane. However, the tape supporting means can be mounted either in horizontal or vertical orientations. Moreover, the tape transport 20 is adapted to drive a tape contained in a tape cartridge, but the tape transport can be modified to drive other types of tape supply means without departing from the scope of the invention.

The cartridge deck 22 includes a pair of elongated cartridge guides 26 spaced apart along opposite sides of the deck for receiving the tape cartridge 24 and holding it in place in a fixed operative position on the deck. The cartridge shown in the drawings is the type which includes a rectangular shell 28 in which are mounted a pair of reel hubs 30 and 32, a magnetic recording tape 34 wound on the reel hubs, a belt drive roller or pulley 36, a pair of tape guide rollers 38 and 39, a drive belt 40 engaged with the drive pulley 36, and a pair of belt guide rollers 41 and 42. However, other types of tape cartridges adapted to contact a single capstan for driving the tape 34 can be used.

The front edge of the cartridge 24 includes an elongated opening 44 to provide access for a capstan 46 of the tape transport. When the tape cartridge 24 is in its operative position, the capstan engages the pulley 36 and is rotatable bi-directionally to turn the pulley which drives the belt 40 which, in turn, drives the tape 34. A magnetic recording head (not shown) also gains access to the tape through an elongated opening 48 in the front edge of the cartridge 24.

A reversible drive motor 50 is mounted below the cartridge support deck 22. The top of the motor 50 is located in an over-sized round hole 51 in the deck 22. The motor has an elongated output shaft 52 which extends through the hole in the tape deck 22 for attachment to the capstan 46 so that bi-directional rotation of the motor will apply bi-directional movement to the tape 34.

The motor 50 is attached to an elongated heat sink structure 54 formed from a metal block with appropriate heat transfer fins for dissipating heat generated by the motor during operation of the tape transport. The heat sink structure is connected directly to the exterior casing of the motor and comprises a rectangular-shaped metal extrusion which surrounds the motor, extending away from the motor in both lateral and longitudinal directions to carry away heat generated by the motor. As shown best in FIGS. 3, 4 and 5, one-half of the heat sink structure (the division being generally along the longitudinal axis of the heat sink) includes a series of spaced apart vertical heat transfer fins 56 extending from top to bottom of the heat sink. As shown best in FIGS. 2 and 6, the other half of the heat sink structure includes a series of spaced apart horizontal heat transfer fins 58 extending from end-to-end of the heat sink structure.

Preferably, the heat sink structure is made from black anodized aluminum which is a good conductor for drawing heat to the heat transfer fins quickly and for providing good radiation of the heat generated. During use, when heat is generated by the motor, the vertical heat transfer fins rapidly conduct heat away from the motor and also allow cooler ambient air to be drawn in at the bottom of the heat sink. The heat sink is bi-directional, in that a portion of its heat transfer fins can be mounted vertically, to draw in cooler air from the bottom of the sink, whether the tape transport 20 is mounted in a vertical or horizontal orientation.

Figure 4:
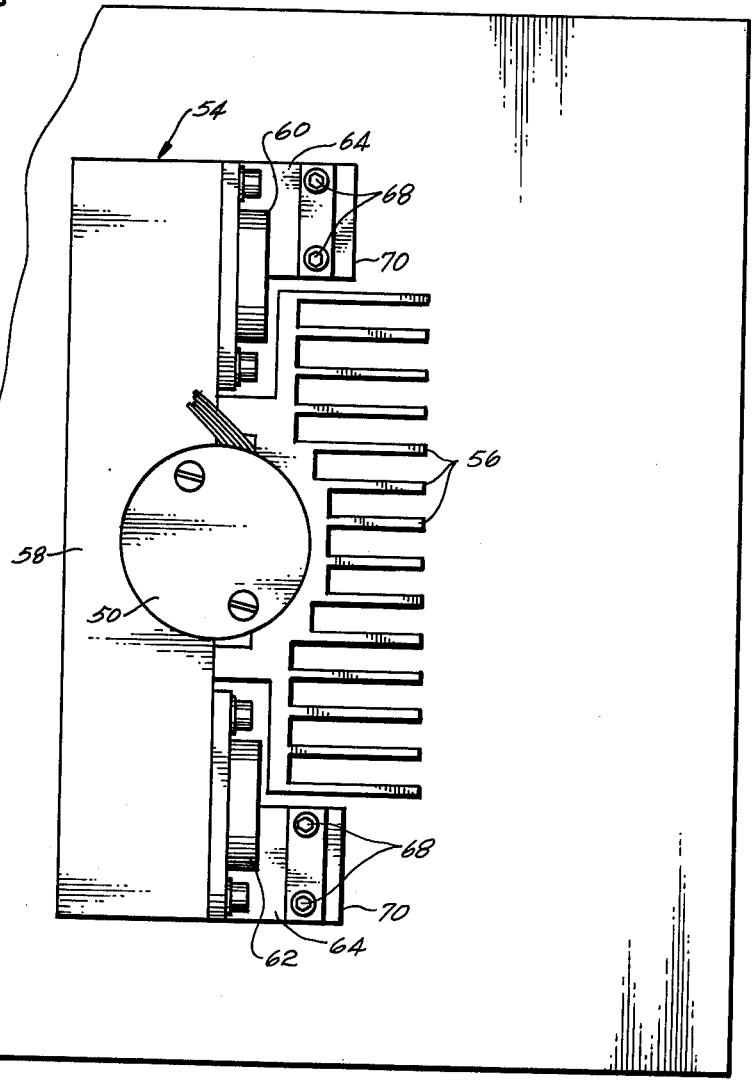
FIG. 4 is a fragmentary bottom plan view taken on line 4—4 of FIG. 2.
Figure 12:
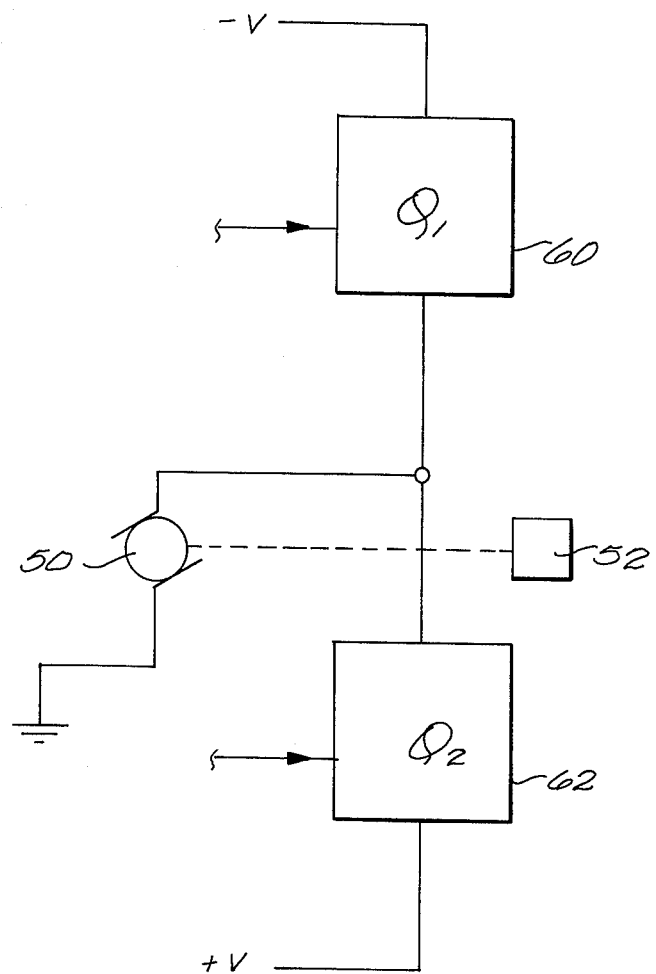
FIG. 12 is a schematic circuit diagram illustrating an electrical circuit for controlling the tape transport.

As shown best in FIGS. 4, 5 and 6, a pair of power transistors 60 and 62 are mounted on the heat sink 54 on opposite sides of the motor 50. The power transistors are connected to an electrical circuit illustrated schematically in FIG. 12 for controlling the capstan motor 50. The metal casing of each transistor is attached to a continuous flat surface of the metal heat sink structure so that both power transistors are an integral part of the heat sink. This combination provides efficient utilization of the unitary heat sink structure independently of temperature changes. For example, power dissipation in the motor tends to be greater at low temperatures than at high temperatures. Conversely, power dissipation for the transistors tends to be greater at high temperatures than at low temperatures. Therefore, the heat sink provides a single source for effectively conducting away heat developed by power dissipation in the motor and transistors over a wide range of temperatures. Furthermore, the heat sink structure provides an effective means for dissipating heat generated by the motor 50 and power transistors 60, 62 independently of variations in input signal levels to the circuit to which the motor and transistors are connected. For example, if a signal variation causes an increase in power dissipation (heat) by the motor and a corresponding decrease in power dissipation by the transistors, or vice versa, the heat sink is available to dissipate the heat generated, whether it comes from the motor or the transistors.

The tape transport also includes a mounting structure which enables the capstan 46 to exert a constant force on the tape drive pulley 36 independently of external forces, such as high g shock loads, being transmitted to the tape transport during use in a high g environment. The mounting structure generally includes a spring-biased support for mounting the motor, capstan, and heat sink as a unit to the cartridge deck so that the unit can pivot about its center of gravity independently of the orientation of the cartridge deck and tape cartridge.

In the tape transport 20 the spring-biased support includes a pair of longitudinally spaced-apart leaf springs 64, and fasteners 66 for attaching one end of the leaf springs 64 to the heat sink. Fasteners 68 connect the opposite ends of heat springs 64 to the bottoms of a pair of spaced apart blocks 70 rigidly attached to and extending down from the underside of the cartridge deck 22.

The spring-biased support also includes a pair of spaced apart vertical leaf springs 72 located on opposite sides of the motor 50 and spaced between the motor and the horizontal leaf springs 64. The bottom portions of the vertical leaf springs 72 are attached to the heat sink by a pair of spaced apart fasteners 74. A second pair of fasteners 76 connect the tops of each vertical leaf spring to blocks 78 rigidly attached to and extending down from the underside of the cartridge deck 22.

The horizontal and vertical leaf springs lie in planes which intersect at 90° angles and pass through the center of gravity of the combined motor, capstan, power transistors, and heat sink assembly. As shown best in FIG. 2, the horizontal and vertical leaf springs pass through a longitudinal axis which extends through the center of gravity and perpendicular to the capstan axis of rotation.

Preferably, the leaf springs are made from a heat-treated stainless steel about 0.008 inch in thickness, such as the type of spring steel product No. 177-PH Stainless Steel sold by Republic Steel Corporation.

The leaf springs are designed with a slight amount of pretension so that when the tape cartridge is in place the cartridge deck 22, the horizontal and vertical leaf springs are straight (in horizontal and vertical planes), and the capstan applies 20 ounces of force to the tape drive pulley 36.

During use, the cartridge deck 22 is fixed to the particular support or substrate base 80 designed to hold the tape transport in place in its data recovery environment. The motor, capstan, and heat sink assembly is suspended from the fixed cartridge deck for movement about the axis through the center of gravity of the assembly. This allows the tape drive assembly (capstan, power transistors, motor, and heat sink) to pivot relative to the fixed cartridge deck 22 and about the longitudinal axis through the center of gravity. Thus, the capstan 46 is immune to external forces transmitted to the tape drive assembly in a direction which would tend to displace the capstan from the tape drive pulley 36. The spring-biased support prevents displacement of the capstan relative to the cartridge by reacting to external forces to in effect balance these forces due to the mounting of the tape drive assembly about its center of gravity. This continuously exerts a substantially constant force on the tape drive pulley 36 independently of the forces being applied. The spring-biased support also is bi-directional in that the capstan will maintain a constant force on the tape drive pulley independently of the horizontal or vertical orientation of the cartridge deck.

FIGS. 7 through 11 show an alternate tape transport 120 which includes both a modified heat sink structure 154 and a modified biasing spring support. The modified heat sink assembly is depicted best in FIGS. 8 and 9. Each half of the heat sink structure 154 is a separate elongated, generally rectangular metal extrusion. Both extrusions are fitted around the capstan drive motor 150 and fastened together to form the completed heat sink. Before the two extrusions are fastened together, the power transistors 160 and 162 are attached to one of the extrusions. The other extrusion includes openings 182 and 184 for receiving the transistors when the two extrusions are attached.

One-half of the heat sink structure includes a series of spaced apart vertical heat transfer fins 156 extending from top to bottom along the height of the heat sink. At the opposite ends of the vertical fins 156 are separate series of vertically extending side fins 186 and 187. The other half of the heat sink includes a series of horizontal heat transfer fins 158 extending from end-to-end along the heat sink. The top and bottom of the horizontal heat transfer fins 158 include downwardly and upwardly facing side fins 188 and 189, respectively. The side fins provide vertical heat transfer fins at the ends of the heat sink for rapidly conducting heat away from the ends of the heat sink independently of the horizontal or vertical orientation of the cartridge deck.

The modified tape transport 120 also includes a torsion spring mounting arrangement through which the capstan continuously applies a constant driving force to the tape cartridge drive pulley independently of forces being applied to the fixed cartridge support. As shown best in FIG. 7, the spring assembly includes a torsion spring 190 attached to one end of the heat sink 154, and a straight pivot pin 192 attached to the opposite end of the heat sink. The long portion of the torsion spring 190 and the pivot pin 192 are collinear with the longitudinal axis extending through the center of gravity of the tape drive assembly (motor, capstan, power transistors and heat sink). The pivot pin 192 extends through a horizontal clearance hole provided in a mounting block assembly 194 extending down from one side of the cartridge deck 122. The torsion spring 190 includes a right-angle leg 196 extending up into a clearance hole in a mounting block assembly 198 extending down from the other side of the cartridge deck. Thus, the motor, capstan, and heat sink assembly is free to pivot about its center of gravity independently of the fixed cartridge deck 122.

Preferably, the torsion spring and pivot pin are made from steel wire having a diameter from 0.010 to 0.015 inch.

In use, when the tape drive assembly is subjected to external forces, these forces will be balanced due to the mounting of the motor, capstan, and heat sink assembly on its center of gravity, and the capstan will continue to exert a constant force on the cartridge drive pulley. In addition, the torsion spring arrangement is mounting-orientation independent, in that a constant force will be exerted independent of the mounting orientation of the tape cartridge and drive.

The mounting arrangement shown in FIGS. 7 through 11 includes one torsion spring and one pivot pin, but the pivot pin can be replaced with a second torsion spring, and still produce a constant capstan tension independent of mounting orientation.

The torsion spring also includes an angled leg 199 which extends at an angle $\alpha$ of preferably 20° relative to the long portion of the torsion spring (when the length of the spring is in a horizontal plane and the leg 196 is in a vertical plane, as shown in FIG. 11). The angled portion 199 is mounted in a clearance hole lying in a horizontal plane, as does the long portion of the torsion spring. When the leg 196 is inserted into the vertical clearance hole, the torsion spring will rotate the capstan toward the cartridge so that the capstan will be pretensioned against the cartridge drive pulley with a force or 20 ounces.

Thus, the invention provides a tape transport in which the capstan applies a constant force independently of external forces or shock loads acting on the tape cartridge unit. Moreover, the tape transport provides a heat sink assembly which gains maximum utilization of the heat dissipation capabilities of the heat sink for heat generated by the capstan motor and the power transistors in the electrical circuit which controls the motor.

We claim:

1. A tape transport assembly for driving a tape comprising:

tape drive means including a capstan for driving a tape, and a motor for driving the capstan, the tape drive means having a center of gravity and a pivotal axis extending through the center of gravity;

tape support means for positioning a tape supply means in an operative position relative to the capstan so that capstan-engaging means within the tape supply means enables a tape to be driven in response to rotation of the capstan; and spring-biasing means mounting the tape drive means to pivot relative to the tape support means about said pivotal axis to provide spring-biased engagement of the capstan with said capstan-engaging means so that, when the tape supply means is mounted in said operative position, the capstan will continuously apply a substantially constant force to said capstan-engaging means, independently of external forces acting on the tape support means and the tape drive means, when the tape support means is mounted in a fixed position and the tape drive means is allowed to pivot freely relative to the tape support means through said spring-biasing means.

2. Apparatus according to claim 1 in which the tape support means includes means for holding the tape supply means in said operative position with the capstan-engaging means in the path of spring-biased movement of the capstan; and means for pretensioning the spring-biasing means so that the capstan will apply a fixed amount of force to the capstan-engaging means when the tape support means is being held in said fixed position.

3. Apparatus according to claim 1 in which the capstan has an axis of rotation; and in which the spring-biasing means comprises spaced apart springs located on opposite sides of the capstan axis of rotation, the springs extending on said pivotal axis to provide means for allowing the tape drive to pivot about said pivotal axis and for providing said spring-biased engagement of the capstan with the capstan-engaging means.

4. Apparatus according to claim 1 in which the spring-biasing means comprises at least one torsion spring having an elongated portion extending along said pivotal axis.

5. Apparatus according to claim 4 in which the torsion spring includes an angled portion extending transversely to the pivotal axis and through said pivotal axis for applying an amount of pretension between the capstan and the capstan-engaging means proportional to the angle between said angled portion and said elongated portion of the torsion spring.

6. Apparatus according to claim 1 in which the capstan has an axis of rotation; and in which the spring-biasing means comprises a pair of spaced apart horizontal leaf springs located on opposite sides of the capstan axis of rotation and extending from the tape drive means to the tape support means, and a pair of spaced apart vertical leaf springs located on opposite sides of the capstan axis of rotation and also extending from the tape drive assembly to the tape support means, the horizontal and vertical leaf springs all being positioned to pass through said pivotal axis.

7. Apparatus according to claim 1 in which the tape drive means further includes a heat sink structure surrounding the exterior of the motor and attached directly thereto for dissipating heat generated by the motor.

8. Apparatus according to claim 7 in which the spring-biasing means extends from the heat sink structure to the tape support means.

9. Apparatus according to claim 7 including a series of spaced apart, vertically extending, elongated heat transfer fins on one portion of the heat sink structure; and a series of spaced apart horizontally extending heat transfer fins on another portion of the heat sink structure to provide bi-directional heat dissipation for heat generated by the motor.

10. Apparatus according to claim 7 including an electrical circuit element for being connected to an electrical circuit for controlling operation of the capstan drive motor, the electrical circuit element having a power dissipation characteristic generally inverse to that of the capstan drive motor in operation of said electrical circuit, the electrical circuit element also being attached as an integral part of the heat sink structure so the heat sink structure will dissipate heat generated by the electrical circuit element.

11. Apparatus according to claim 10 in which the electrical circuit element comprises at least one power transistor having a casing attached to the heat sink structure.

12. Apparatus according to claim 1 in which the tape drive means further includes a heat sink structure secured to the exterior of the motor and attached directly thereto for dissipating heat generated by the motor; and further including power transistor means attached to the heat sink structure to dissipate heat generated by the transistor means, the transistor means also being adapted for connection to an electrical circuit for controlling operation of the capstan drive motor, the transistor means having a power dissipation characteristic generally inverse to that of the capstan drive motor in operation of said electrical circuit.

13. Apparatus according to claim 12 in which said pivotal axis extends through the center of gravity of the combined capstan, drive motor, power transistor means and heat sink structure.

14. Apparatus according to claim 1 in which the spring-biasing means comprises (1) a torsion spring having an elongated portion extending along the pivotal axis, and an angled portion extending transversely to the pivotal axis to provide spring-biased engagement of the capstan with the capstan-engaging means, and (2) an elongated pivot pin collinear with and spaced from the elongated portion of the torsion spring, the pivot pin extending through said pivotal axis, the pivot pin and said elongated portion providing pivotal movement of the capstan toward the capstan-engaging means.

15. Apparatus according to claim 14 including a heat sink structure surrounding the exterior of the capstan motor and attached directly thereto for dissipating heat generated by the motor; and in which the torsion spring and the pivot pin extend between the heat sink structure and the tape support means.

16. Apparatus according to claim 1 in which the spring-biasing means comprises pivot means mounting the tape drive means to the tape support means for allowing the tape drive means to pivot relative to the tape support means about said pivotal axis, and a spring member for urging the capstan into spring-biased engagement with said capstan-engaging means when the tape support means pivots about said pivotal axis.

17. A tape transport comprising:
a capstan for driving a tape;
a motor for driving the capstan;
a heat sink structure secured to the motor and attached thereto for dissipating heat generated by the motor;
an electrical circuit element for being connected to an electrical system for controlling operation of the capstan drive motor, the circuit element having a power dissipation characteristic generally inverse to that of the capstan motor during operation of the electrical system, the circuit element also being attached as an integral part of the heat sink structure so the heat sink structure will dissipate heat generated by the electrical circuit element;
tape support means for supporting a tape supply means in an operative position relative to the capstan so that capstan-engaging means within the tape supply means enables a tape to be driven in response to rotation of the capstan; and
spring-biasing means mounting the capstan, the motor, the circuit element, and the heat sink structure as a unit on the tape support means for independent pivotal movement of said unit relative to the tape support means about a pivotal axis through the center of gravity of said unit to provide spring-biased engagement of the capstan with said capstan-engaging means so that, when the tape supply means is mounted in said operative position, the capstan will continuously apply a substantially constant force to said capstan-engaging means, independently of external forces acting on the tape support means and said unit, when the tape support means is mounted in a fixed position and said unit is allowed to pivot freely relative to the tape support means through said spring-biasing means.

18. A tape transport assembly for driving a tape comprising:
tape drive means including a capstan for driving a tape, and a motor for driving the capstan, the tape drive means having a center of gravity and a pivotal axis extending through the center of gravity of the tape drive means;
tape support means for holding a tape supply means in an operative position relative to the capstan so that capstan-engaging means within the tape supply means enables a tape to be driven in response to rotation of the capstan;

means mounting the tape drive means to the tape support means to position the tape supply means in said operative position so that the capstan is located adjacent the capstan-engaging means and to enable the tape drive means to pivot freely about said pivotal axis to enable the capstan to move along a path toward the capstan-engaging means; and spring-biasing means providing spring-biased movement of the capstan along said path toward the capstan-engaging means, so that the capstan will continuously apply a substantially constant force to the capstan-engaging means, independently of external forces acting on the tape support means, when the tape support means is mounted in a fixed position and the tape drive means is allowed to freely pivot relative to the tape support means.

19. Apparatus according to claim 18 in which the spring-biasing means enables the tape drive means to pivot solely about said pivotal axis.

20. Apparatus according to claim 18 in which the tape drive means includes a heat sink structure secured to the exterior of the motor and attached directly thereto for dissipating heat generated by the motor; and an electrical circuit element for being connected to an electrical circuit for controlling operation of the capstan drive motor, the circuit element having a power dissipation characteristic generally inverse to that of the capstan drive motor in operation of said electrical circuit, the circuit element also being attached as an integral part of the heat sink structure so that the heat sink structure will dissipate heat generated by the circuit element.

21. Apparatus according to claim 18 in which the tape drive means includes a heat sink structure secured to the exterior of the motor to dissipate heat generated by the motor; and in which the heat sink structure includes a series of spaced apart, verticlly extending, elongated heat transfer fins on one portion of the heat sink structure, and a series of spaced apart, horizontally extending, heat transfer fins on another portion of the heat sink structure to provide bi-directional heat dissipation for the heat generated by the motor, the vertical heat transfer fins being generally parallel to the capstan axis of rotation, the horizontal heat transfer fins being generally perpendicular to the capstan axis of rotation.

22. Apparatus according to claim 18 including a heat sink structure secured to the capstan motor; and in which the spring-biasing means extends between the heat sink structure and the tape support means.

23. Apparatus according to claim 22 in which the spring-biasing means comprises pivot means mounting the tape drive means to the tape support means for allowing the tape drive means to pivot relative to the tape support means about said pivotal axis; and a spring member for urging the capstan into spring-biased engagement with said capstan-engaging means when the tape support means pivots about said pivotal axis.

24. Apparatus according to claim 18 in which the capstan has a capstan axis of rotation; and including a heat sink structure secured directly to the capstan motor to dissipate heat generated by the motor; and in which the spring-biasing means comprises spaced apart springs located on opposite sides of the capstan axis of rotation, the springs extending through said pivotal axis and extending between the heat sink structure and the tape support means, the springs providing means for allowing the tape drive means to pivot about said pivotal axis and for providing said spring-biased engagement of the capstan with the capstan-engaging means.

25. Apparatus according to claim 18 in which the spring-biasing means comprises at least one torsion spring having an elongated portion extending along said pivotal axis.

26. Apparatus according to claim 25 in which the torsion spring includes an angled portion extending transversely to the pivotal axis and through said pivotal axis.

* * * * *

UNITED STATES PATENT AND TRADEMARK OFFICE
CERTIFICATE OF CORRECTION

Figure 9:
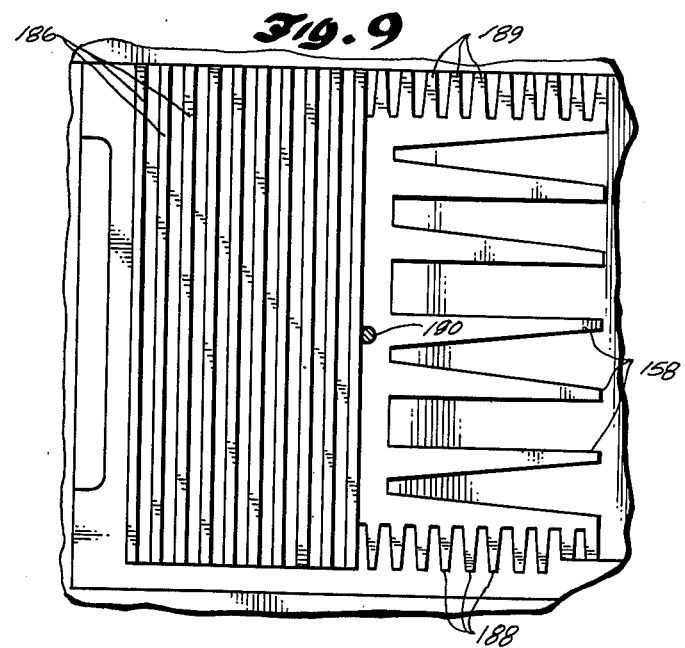
FIG. 9 is a fragmentary end elevation view taken on line 9—9 of FIG. 9.
Figure 8:
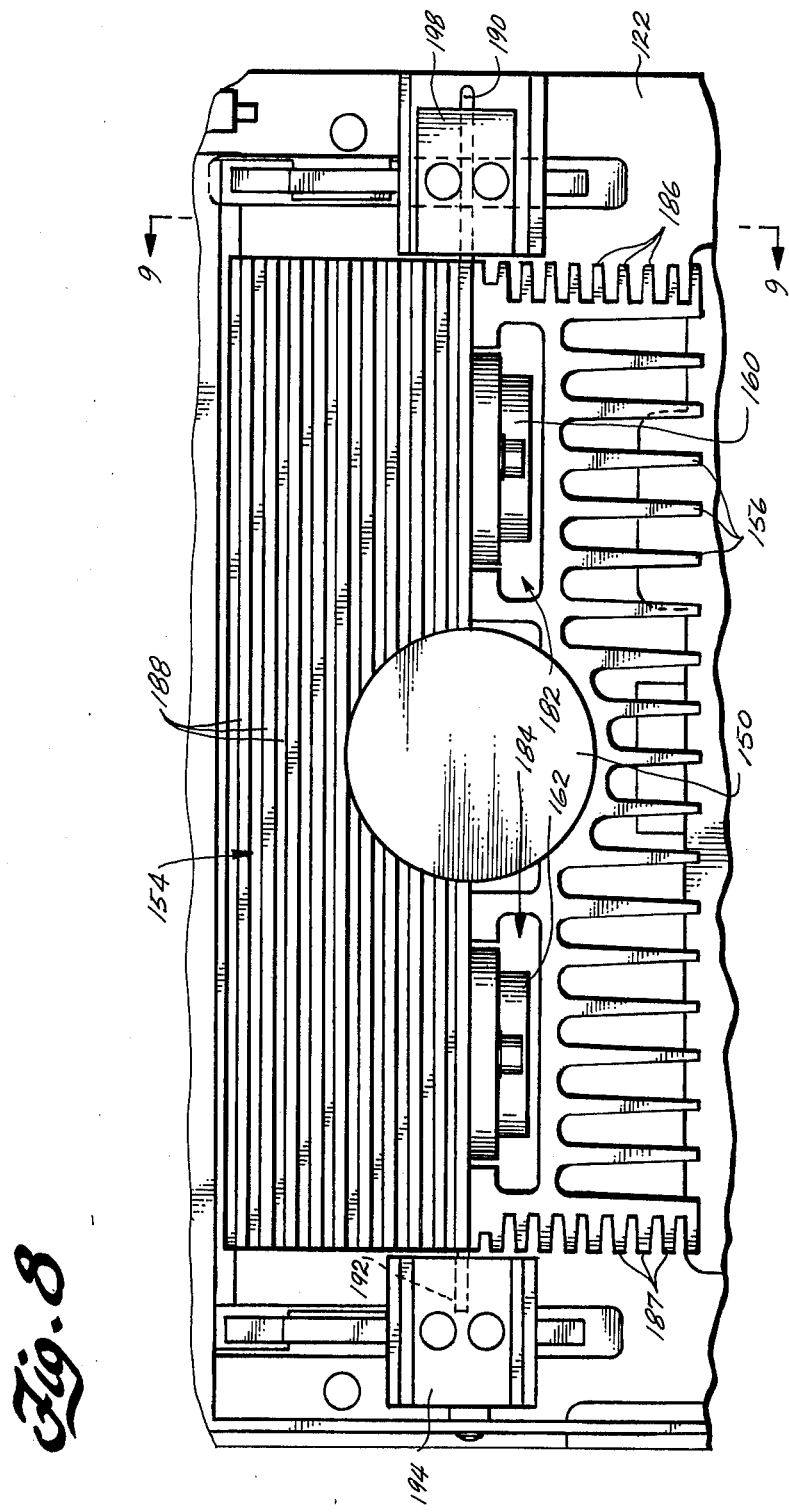
FIG. 8 is a fragmentary bottom plan view taken on line 8—8 of FIG. 7.

PATENT NO. : 4,106,686
DATED     : August 15, 1978
INVENTOR(S) : William W. Valliant et al It is certified that error appears in the above-identified patent and that said Letters Patent are hereby corrected as shown below:

Col. 2, line 33, "of FIG. 9" should read -- of FIG. 8 --.

Col. 4, line 18, "heat" should read -- leaf --.

Col. 6, line 11, "or" should read -- of --.

Col. 9, line 37, "verticlly" should read -- vertically --.
(Claim 21)

*Signed and Sealed this*

*Thirteenth* Day of *March 1979*

[SEAL]

Attest:

RUTH C. MASON
*Attesting Officer*

DONALD W. BANNER
*Commissioner of Patents and Trademarks*